Feb. 11, 1947.    J. A. TAYLOR ET AL    2,415,452
ELECTRICAL INDICATING DEVICE
Filed April 16, 1945
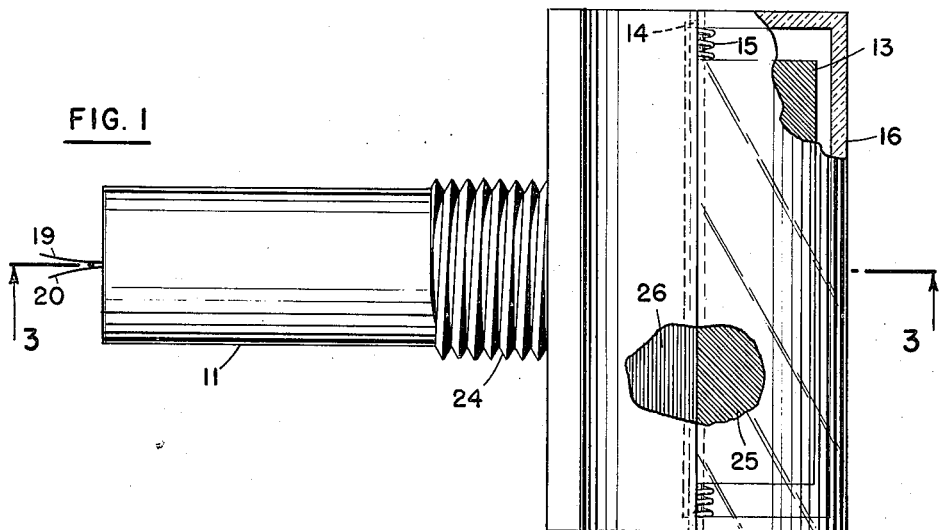
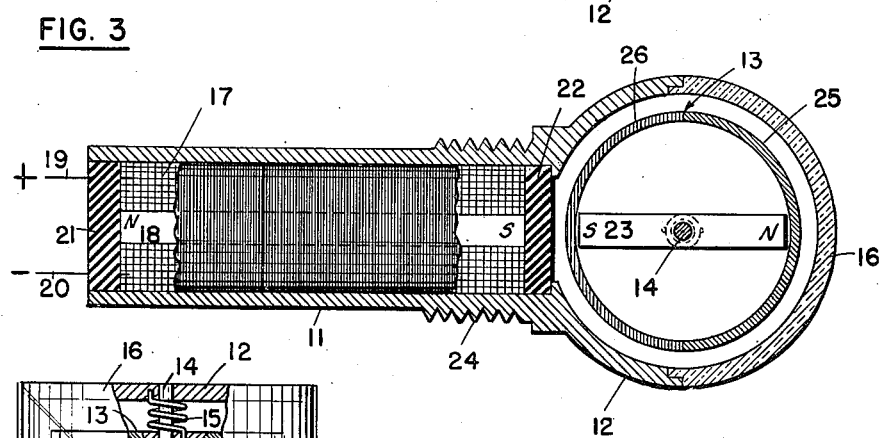
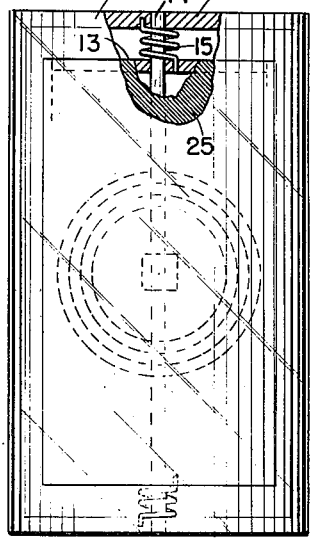
INVENTORS
JOHN A. TAYLOR
MILTON A. KNIGHT
ATTORNEY Patented Feb. 11, 1947

2,415,452

UNITED STATES PATENT OFFICE 2,415,452

ELECTRICAL INDICATING DEVICE

John A. Taylor, Washington, D. C., and Milton A. Knight, Arlington, Va.

Application April 16, 1945, Serial No. 588,511

4 Claims. (Cl. 177—329)

(Granted under the act of March 3, 1883, as amended April 30, 1928; 370 O. G. 757)

Our invention relates to electrical indicating devices.

More particularly our invention relates to a device for indicating the condition of an electric circuit by changing the portion of a movable member visible through a window of the device.

The object of our invention is to provide an annunciator or indicator to furnish an indication of the condition of external apparatus. More particularly the object is to provide an indicator of this type which will not require the use of electric indicator lights, will be readily viewable in relatively bright light or in relative darkness, will not tend to blind an operator at night, will be readily distinguished when several indicators are used in a group, and will not be subject to burning out. An additional object is to provide an indicator without internal flexible or sliding electrical connections.

To accomplish these objects, we provide a device of the type detailed in the following description and shown in the accompanying drawing of which:

Fig. 1 is a top view of the device, partially cut away.

Fig. 2 is a front view, partially cut away, and

Fig. 3 is a sectional side view taken through plane 3—3 of Fig. 1.

The device comprises, in its preferred embodiment shown generally in Fig. 1 of the drawing, a hollow casing which may be of a non-magnetic metal, plastic or similar material and which comprises a substantially cylindrical portion 11 and a forward extending, semi-cylindrical, cup-like portion 12. A hollow cylindrical bi-colored member 13 preferably of a light weight plastic material is mounted on an axle 14 for rotation about the longitudinal axis of the cylinder, but is spring-tensioned into a desired rotational position by spiral springs 15 at either end of the cylinder. A transparent semicylindrical window 16, of glass or transparent plastic, completes a hollow cylindrical case for the colored cylinder. Screw threads 24 are preferably provided for convenience in mounting the device.

As shown in Fig. 2, the colored cylinder 13 is mounted on axle 14 visible through window 16 and spring tensioned in a predetermined rotative position about the axle by springs 15.

Fig. 3 is a sectional view of the device taken on plane 3—3 of Fig. 1 showing electro-magnet winding 17 around a soft iron core 18. Electric current is supplied through connections 19 and 20 in a predetermined polarity. The windings and core are hermetically sealed at the rearward end of housing 11 by a plug 21, and sealed toward the forward end by plug 22. A permanent bar magnet 23 is secured within cylinder 13 and is adapted to rotate about axle 14 with cylinder 13. The surfaces of the cylinder is colored preferably green for the half 25 shown next to the window 16 in Fig. 3, which is the rotative position of the cylinder determined by the tension of springs 15 when the electro-magnet is not energized. Under these conditions the green-colored half 25 of the cylinder will be visible through window 16 as shown in Figs. 1 and 2. The other half 26 of the cylinder, that is the portion which is not visible in Figs. 1 or 2, may be conveniently colored red. The colors red and green are used since they are the conventional "on" and "off" or "warning" and "all clear" signal colors, respectively, as appropriate in the particular application of an indicating device. Other colors may be more desirable in certain circumstances.

The arrangement of permanent magnet 23 is such that when electro-magnet core 18 is magnetized by a current of predetermined polarity flowing in the windings 17, the magnetic pole produced at the end of core 18 nearest magnet 23 repels the pole of magnet 23 which is in the center of the red portion 26 of cylinder 13 and attrackts the pole of magnet 23 which is in the center of the green portion 25 of cylinder 13.

The device is utilized to indicate whether or not a direct current circuit is energized my providing current to the windings 17 whenever the external circuit is energized. The core 18 will have a magnetic pole at each end when the winding is energized. The end of the core nearest plug 21 may be assumed to be a north pole, the end nearest plug 22 and cylinder 13 a south pole. The permanent magnet secured inside cylinder 13 is arranged with the north pole at the end in the center of the green portion 25 of cylinder 13 and a south pole at the end in the red portion 26. The south pole of the electro-magnet core, being close to the south pole of the permanent magnet, creates a repulsive force on the south pole of the permanent magnet forcing cylinder 13 and magnet 23 to revolve substantially 180° against the spring tension of springs 15, placing the red portion 26 of the cylinder in visible position behind the window 16. In this position the attraction between the south pole of the core and the adjacent north pole of the permanent magnet, at the end in the green portion 25, holds the cylinder substantially stationary. Upon a change in the external condition being indicated, the current through the electro-magnet winding may be cut off by any well known means such as switching devices; the magnetism of the core thus being destroyed, springs 15 are effective to revolve the cylinder back into its original position with the green side only visible through the window. It is also practicable to connect the electro-magnet into an external circuit in such a manner that the magnet will be energized when the external circuit is energized. The device will then constitute an "on-off" indicator.

It is contemplated that the device described will be of particular applicability to replace pilot lights heretofore utilized to indicate the operative condition of various circuits or of other components, such as dive brakes, flaps, or landing gear, in aircraft applications or wherever it is desired to furnish an indicator which will be bright enough to see by day, though not so bright as to adversely affect the visual acuity or eye sensitivity of the operator or pilot during night operations. An additional advantage lies in the fact that the device is less apt to cause confusion and misreading when two or more indicators are required in close proximity to each other. Furthermore, the indicating element is rotated substantially 180° without the use of electrical connections to any moving element, and only one moving part is required. The usual disadvantages that result from the use of flexible or sliding electrical connections are eliminated.

It is apparent that the opposite halves 25 and 26 of the cylinder may be marked otherwise than by red and green coloring, such as by the use of writing, by the application of phosphorescent materials, or by geometric colored or black and white designs or by any combination of such markings. The type of marking will depend upon the grouping of the devices, the lighting available, the type of condition to be indicated, and other external factors. It will also be apparent that the indicating element described as preferably cylindrical may be spherical, cubical, or flat, or of any other applicable configuration to present a rounded or flat face to view through the window.

Various other modifications and embodiments of the invention will be apparent and we desire to be limited only by the scope of the appended claims.

The invention described herein may be manufactured and used by or for the Government of the United States of America for governmental purposes without the payment of any royalties thereon or therefor.

What we claim is:

1. An electric indicating device comprising a housing, a transparent window forming a portion of said housing, a movable member within said housing in partially viewable position behind said window, a permanent magnet within said housing, an electro-magnet within said housing for cooperation with said permanent magnet to change the position of said permanent magnet in response to energization of said electro-magnet, said member being operatively connected to said permanent magnet, external means for energizing said electro-magnet, spring means for tensioning said movable member to expose to view a portion of the surface of said movable member through said window, said electro-magnet in cooperation with said permanent magnet being effective when energized to overcome said spring means to move said movable member to expose to view through said window a distinguishably different portion of the surface of said movable member.

2. An electric indicating device comprising a housing, a transparent window forming a portion of said housing, a substantially hollow cylinder pivotally mounted for rotation within said housing, a permanent bar magnet secured within said cylinder, spring means for tensioning said cylinder in rotative position to expose to view substantially one half of the outer surface of said cylinder through said window, an electro-magnet within said housing in cooperative relationship with said permanent bar magnet, external means for energizing said electro-magnet, said electro-magnet in cooperation with said permanent bar magnet being effective when energized to overcome said spring means to rotate said cylinder substantially 180° to expose to view through said window the other half of said outer surface, said one half of said surface being visually distinguishable from said other half.

3. In an aircraft, an electrical indicator for indicating the operative condition of a component of said aircraft, said indicator comprising a housing, a substantially hollow cylinder having distinguishable half sections rotatably mounted in a portion of said housing, said portion including a substantially semi-cylindrical window arranged to expose to view substantially one half of the outer surface of said cylinder, a permanent bar magnet secured inside said cylinder, one pole of said bar magnet being disposed in proximity to the center of said one half of said surface of said cylinder and the other pole in proximity to the center of the distinguishable other half of said surface, an electro-magnet arranged in another portion of said housing in cooperative relationship with said permanent bar magnet, external means for energizing said electro-magnet, spring means for tensioning said cylinder in rotative position to expose to view said one half of the outer surface of said cylinder, said electro-magnet in cooperation with said permanent bar magnet being effective when energized to overcome the tension of said spring means to rotate said cylinder substantially 180° to expose to view through said window said other half of said outer surface of said cylinder.

4. In an aircraft, an electric indicating device for indicating the operative condition of a component of said aircraft comprising a housing, a transparent window forming a portion of said housing, a movable member within said housing, a spring device for tensioning said member into predetermined position to expose to view a portion of said member through said window, means comprising an electro-magnet and a cooperating permanent magnet for moving said member against the spring tension to expose to view a distinguishably different portion of said member through said window, energizing means for said electro-magnet, said permanent magnet being movable with respect to the electro-magnet and being secured to said member to move therewith.

JOHN A. TAYLOR.
MILTON A. KNIGHT.

REFERENCES CITED

The following references are of record in the file of this patent:

UNITED STATES PATENTS

| Number | Name | Date |
|---|---|---|
| 2,245,493 | Nothe | June 10, 1941 |
| 2,367,299 | McLarn et al | Jan. 16, 1945 |
| 2,379,542 | Rempt | July 3, 1945 |